United States Patent [19]
Fujimura

[11] Patent Number: 5,945,937
[45] Date of Patent: Aug. 31, 1999

[54] ALONG-TRACK INTERFEROMETRIC SYNTHETIC APERTURE RADAR

[75] Inventor: Takashi Fujimura, Tokyo, Japan

[73] Assignee: NEC Corporation, Tokyo, Japan

[21] Appl. No.: 08/971,260

[22] Filed: Nov. 17, 1997

[30] Foreign Application Priority Data

Nov. 18, 1996 [JP] Japan ................................. 8-306579

[51] Int. Cl.⁶ .................................................. G01S 13/90
[52] U.S. Cl. ........................... 342/25; 342/162; 342/189; 342/192; 342/197
[58] Field of Search ............................. 342/25, 159, 162, 342/189, 192, 196, 197

[56] References Cited

U.S. PATENT DOCUMENTS

| | | | |
|---|---|---|---|
| 4,321,601 | 3/1982 | Richman | 342/25 |
| 4,716,414 | 12/1987 | Luttrell et al. | 342/179 |
| 5,448,241 | 9/1995 | Zeoli et al. | 342/25 |
| 5,463,397 | 10/1995 | Frankot | 342/25 |
| 5,675,550 | 10/1997 | Ekhaus | 367/7 |
| 5,677,693 | 10/1997 | Frankot et al. | 342/25 |
| 5,726,656 | 3/1998 | Frankot | 342/25 |
| 5,736,958 | 4/1998 | Turpin | 342/179 |
| 5,774,089 | 6/1998 | Bamler et al. | 342/25 |

FOREIGN PATENT DOCUMENTS

| | | |
|---|---|---|
| 62-3676 | 1/1987 | Japan . |
| 62-8081 | 1/1987 | Japan . |
| 62-502065 | 8/1987 | Japan . |
| 9-127234 | 5/1997 | Japan . |
| 9-178845 | 7/1997 | Japan . |
| 9-243740 | 9/1997 | Japan . |

OTHER PUBLICATIONS

R. Carande et al., "Dual Baseline and Frequency Along–Track Interferometry", IGARSS'92, IEEE, pp. 1585–1588.

Japanese Office Action dated Jun. 16, 1998, with English language translation of Japanese Examiner's comments.

*Primary Examiner*—John B. Sotomayor
*Attorney, Agent, or Firm*—Whitham, Curtis & Whitham

[57] ABSTRACT

An along-track interferometric SAR (Synthetic Aperture Radar) of the present invention includes a single SAR line and observes a target only once. SAR data derived from a single observation are subjected to look division in order to reproduce two SAR images deviated in time from each other. Interference processing is executed with the two SAR images in order to determine a phase difference. The phase difference is converted to the velocity of the target. This can be done without resorting to any additional hardware.

4 Claims, 16 Drawing Sheets

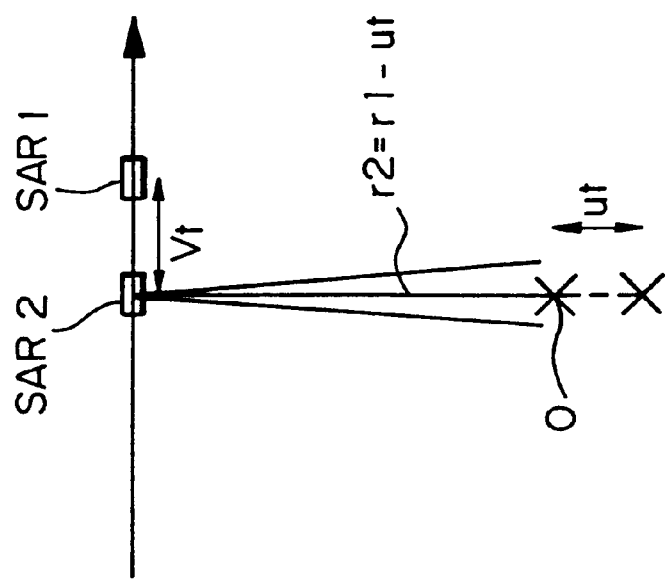
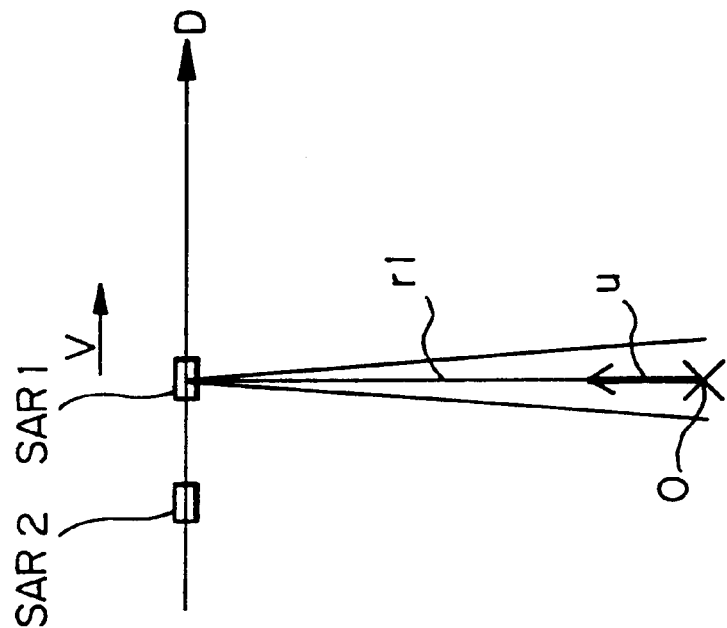
Fig. 1 PRIOR ART

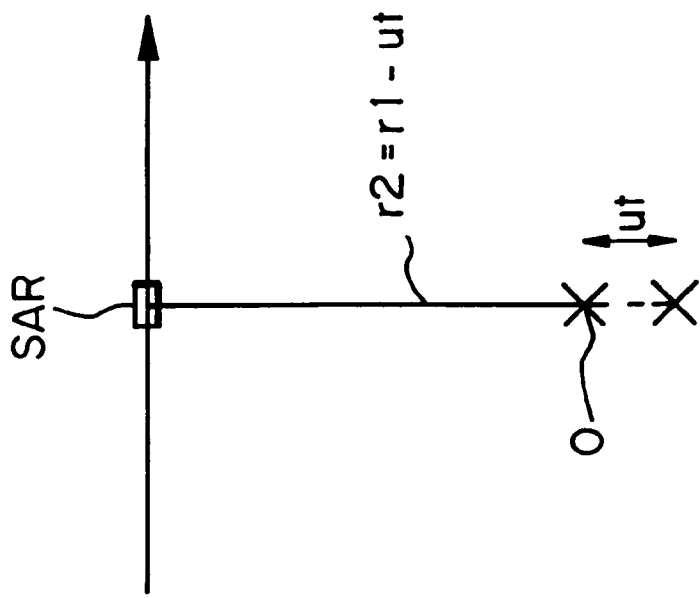
Fig. 5B
2ND OBSERVATION
IN TIME t
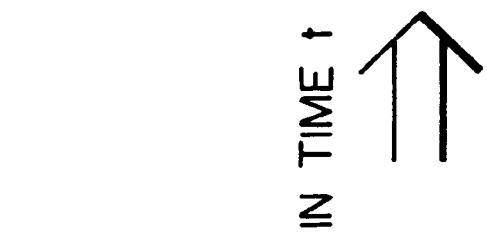
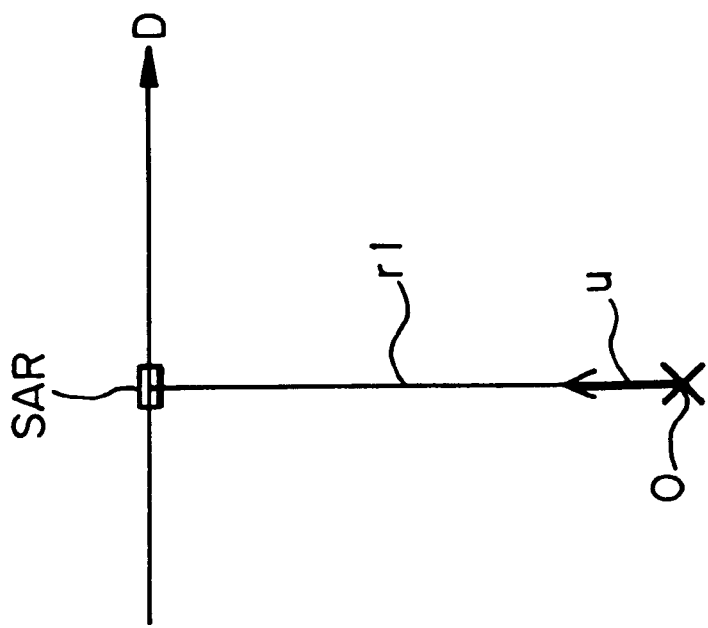
Fig. 5A
1ST OBSERVATION

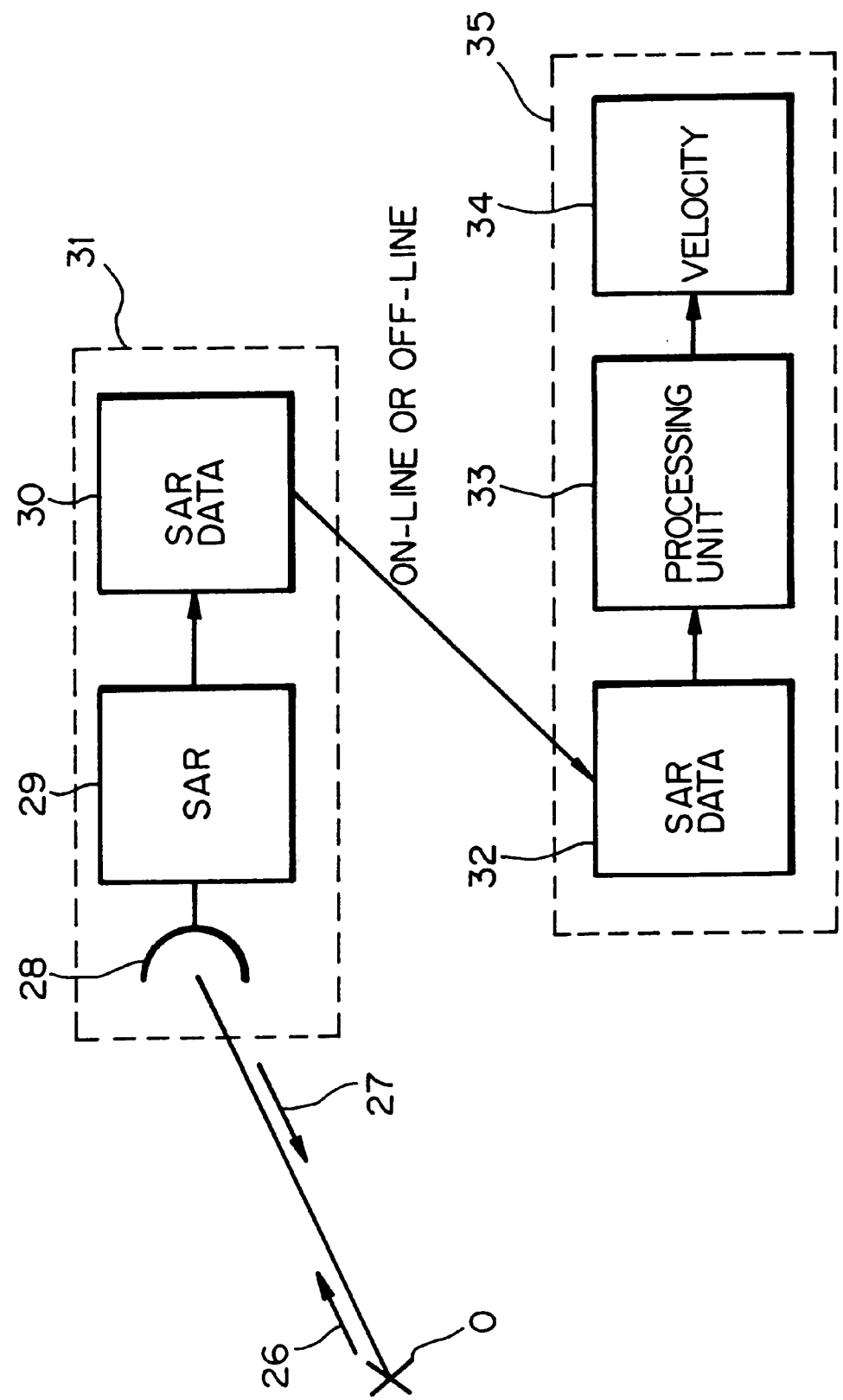

Fig. 7
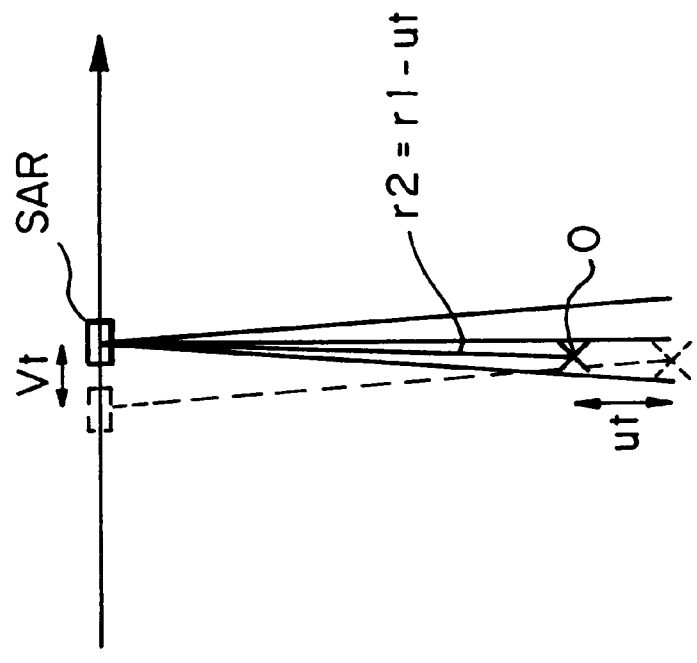
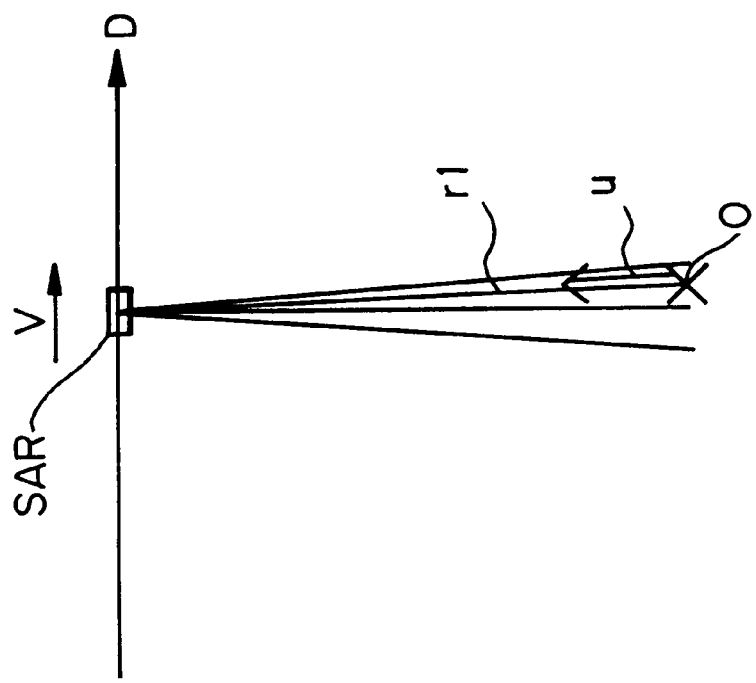

Fig. 9
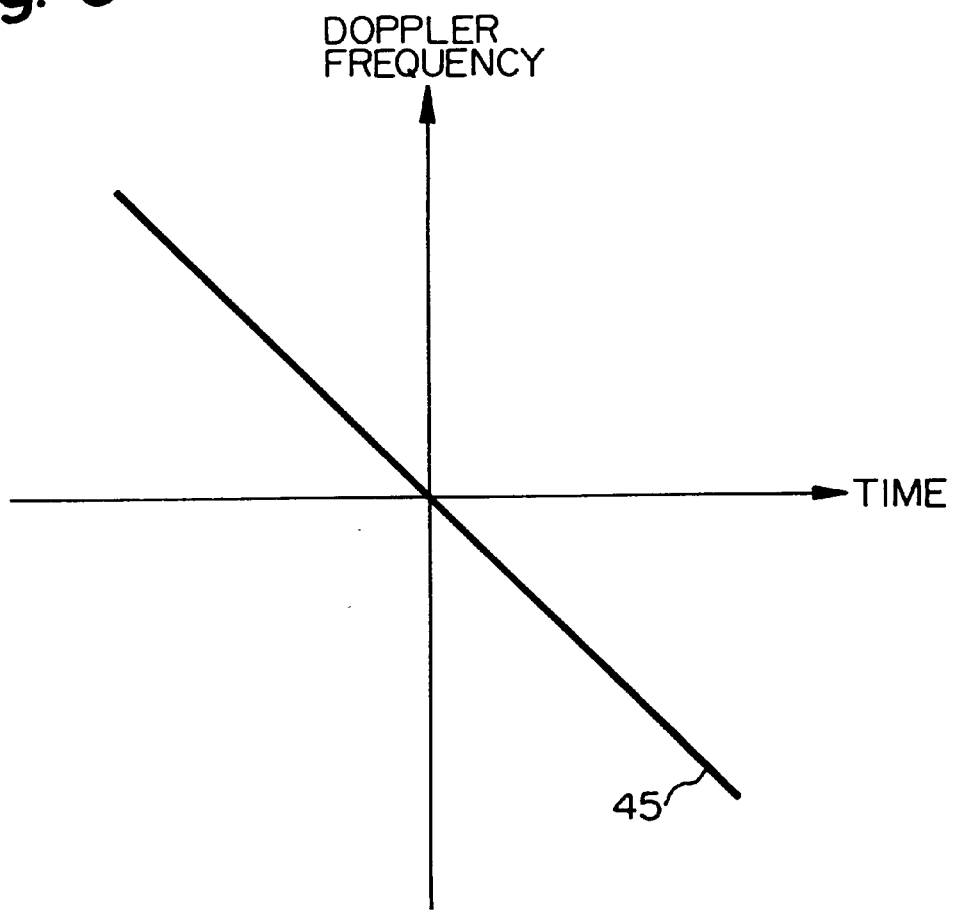
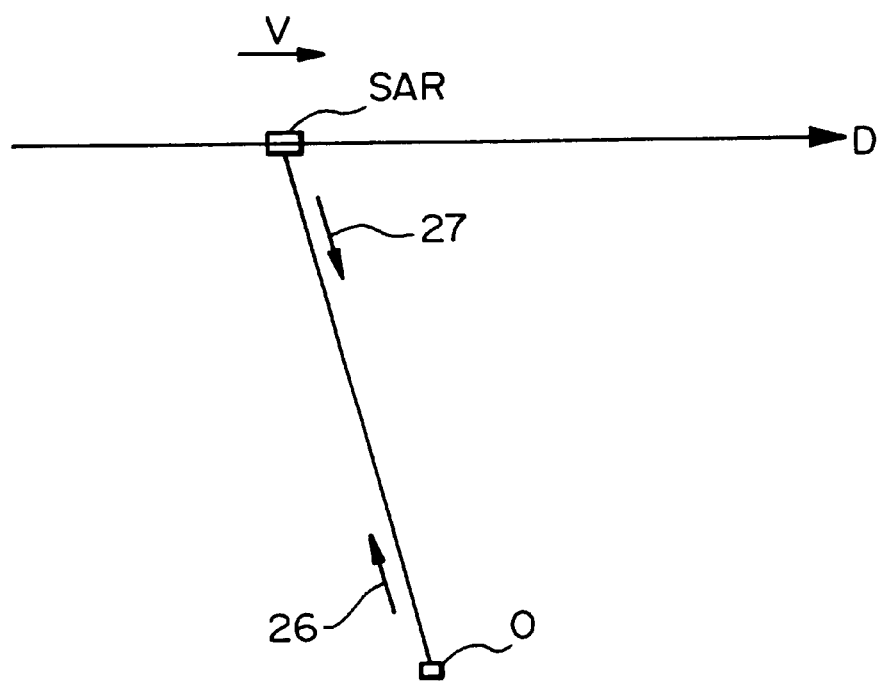

Fig. 13
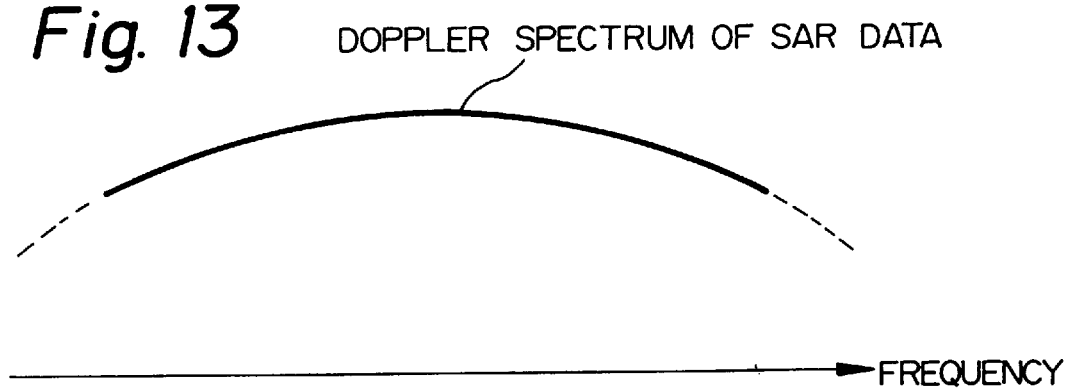
DOPPLER SPECTRUM OF SAR DATA
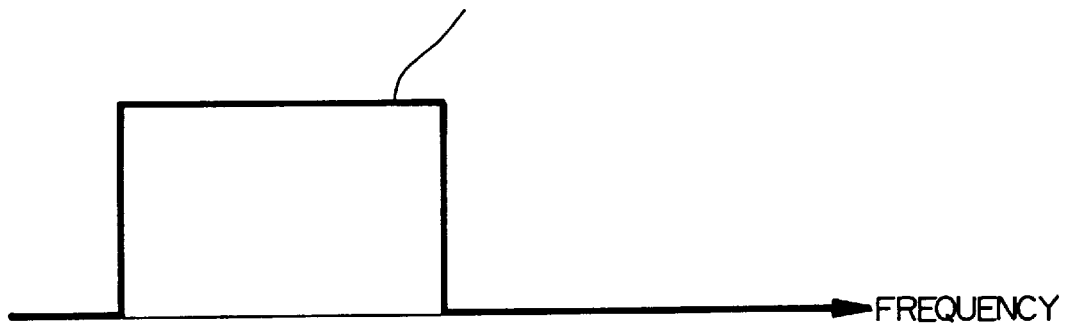
SPECTRUM OF AZIMUTH REFERENCE FUNCTION (FOR LOOK 1)
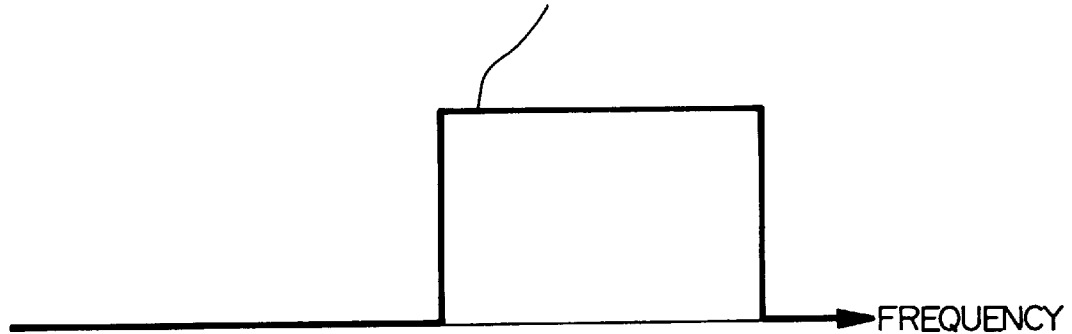
SPECTRUM OF AZIMUTH REFERENCE FUNCTION (FOR LOOK 2)

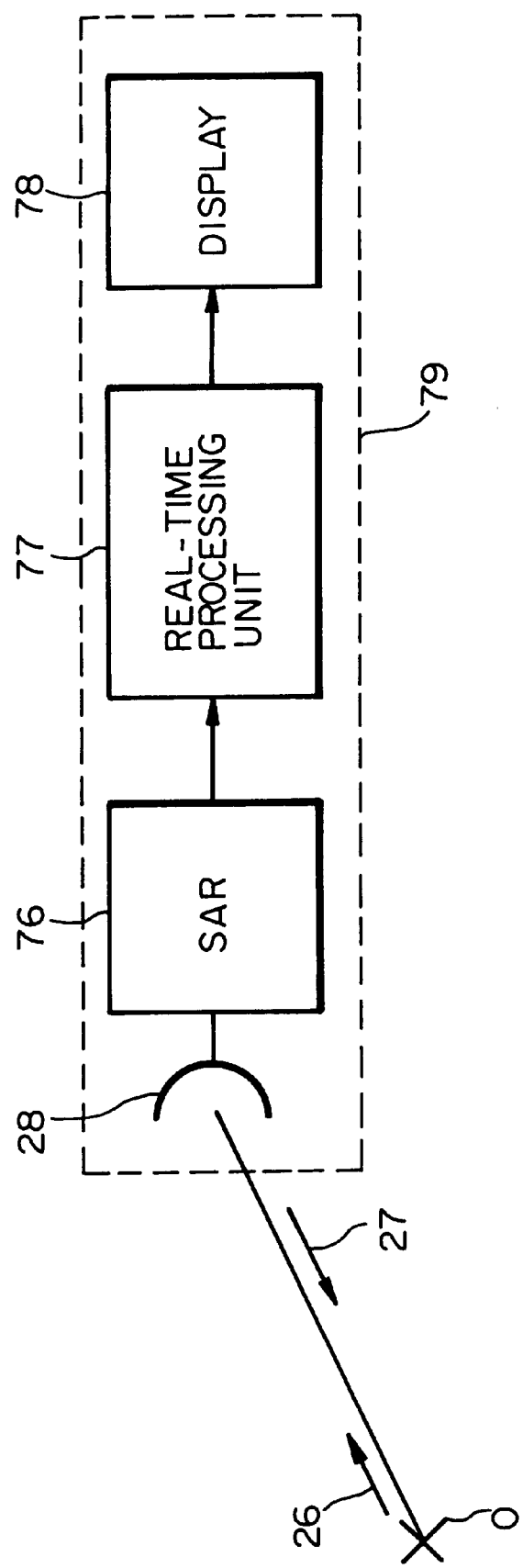

ALONG-TRACK INTERFEROMETRIC SYNTHETIC APERTURE RADAR

BACKGROUND OF THE INVENTION

The present invention relates to a synthetic aperture radar (SAR) and, more particularly, to an along-track interferometric SAR having a single SAR channel and performing observation only once.

Mounted on a satellite, aircraft or similar mobile platform, an SAR transmits a radio wave toward the ground on the side with respect to the direction of movement in order to acquire bidimensional data for reconstructing the image of the ground. The SAR is taught in Japanese Patent Laid-Open Publication Nos. 62-3676 and 62-8081 by way of example.

An SAR is applicable also to the remote detection of the velocity of an object moving on the ground. This kind of application is known as an along-track interferometric SAR and discussed in, e.g., Richard E. Carande "Dual Baseline and Frequency Along-Track Interferometry", '92, IEEE, pp. 1585–1588. The along-track interferometric SAR has two SAR channels adjoining each other in the direction of movement and observes a single target two times at slightly different times, thereby producing two SAR images. The phase difference of the target point is measured on the basis of the two SAR images (interferometric processing) so as to determine the velocity of the target in the direction parallel to the SAR eye direction, i.e., the component of the velocity perpendicular to the azimuth direction. While an SAR is usually operated as a single-channel SAR, its antenna may be divided in the direction of movement and operated as two-channel SAR, i.e., an along-track interferometric SAR (needing two SAR channels). Further, a single-channel SAR may be used to perform observation two times. Specifically, an along-track interferometric SAR can be implemented if a single-channel SAR observes a target once, then returns, and then observes the target on the same course again.

The implementation of the interferometric SAR is disclosed in, e.g., Japanese Patent Laid-Open Publication No. 7-110377. However, the interferometric SAR taught in this document is a cross-track interferometric SAR for acquiring altitude data. Although the processing scheme of a cross-track interferometric SAR resembles the processing scheme of an along-track interferometric SAR, the former is different from the latter as to the kind of data to deal with and the purpose. A cross-track interferometric SAR reconstructs two SAR images based on SAR data observed on different flight courses and thereby acquire the altitude data of a target; the two SAR images are different from each other as to the positional relation to the ground surface. On the other hand, an along-track interferometric SAR reconstructs two SAR images based on SAR data observed on the same flight course at different times and thereby acquire the velocity data of a target; the two SAR images are different from each other as to the time of observation. In a broad sense, an interferometric SAR includes both of a cross-track interferometric SAR and an along-track interferometric SAR, but in a narrow sense it refers to a cross-track interferometric SAR.

The conventional technologies discussed above have some problems left unsolved, as follows.

(1) The along-track interferometric SAR using two SAR channels produces two SAR images deviated in time from each other. Such two-channel SARs cannot implement an along-track interferometric SAR without increasing weight and power consumption, and without needing a high data rate.

(2) The along-track interferometric SAR implemented by a single antenna divided in the direction of movement needs only a single antenna, but two independent channels must follow the antenna. This also increases weight, power consumption and required data rate, and in addition complicates the SAR system.

(3) The method observing a target two times by use of a single-channels SAR is not practicable unless the flight course of an aircraft or a satellite loaded with the SAR is controlled with utmost accuracy in order to bring two times of flight into coincidence as to the course. Moreover, the considerable time lag between the two times of observation severely limits the upper limit of velocity of the target which can be observed.

SUMMARY OF THE INVENTION

It is therefore an object of the present invention to provide an along-track interferometric SAR allowing a single SAR channel and one time of observation to suffice without resorting to any additional hardware.

An along-track interferometric SAR of the present invention includes a single SAR channel for acquiring SAR data by observing a target only once. A reconstructing section reconstructs two SAR images deviated in time from the SAR data to thereby output two reconstructed SAR images. A detecting section calculates a phase difference between the two reconstructed SAR images to thereby detect the velocity of the target in the SAR eye direction. The reconstructing section bisectes, based on the fact that the frequency of a wave returned from the ground undergoes a Doppler shift due to the movement of an SAR relative to the ground, the SAR data in the frequency domain and processes the bisected SAR data.

BRIEF DESCRIPTION OF THE DRAWINGS

The above and other objects, features and advantages of the present invention will become apparent from the following detailed description taken with the accompanying drawings in which:

FIG. 1 shows how a conventional along-track interferometric SAR with two SAR channels is operated;

FIGS. 5A and 5B respectively show the first and second observations performed by an along-track interferometric SAR;

FIG. 6 is a block diagram schematically showing an along-track interferometric SAR embodying the present invention;

FIG. 7 shows how a single-channel SAR included in the embodiment of FIG. 6 implements an along-track interferometric SAR with one time of observation;

FIG. 9 shows the Doppler shift of the frequency of a wave returned from a target;

FIG. 13 shows the Doppler spectrum of SAR data and the Doppler spectra of azimuth reference functions also particular to two looks;

FIG. 15 is a block diagram schematically showing an alternative embodiment of the present invention.

Figure 2:
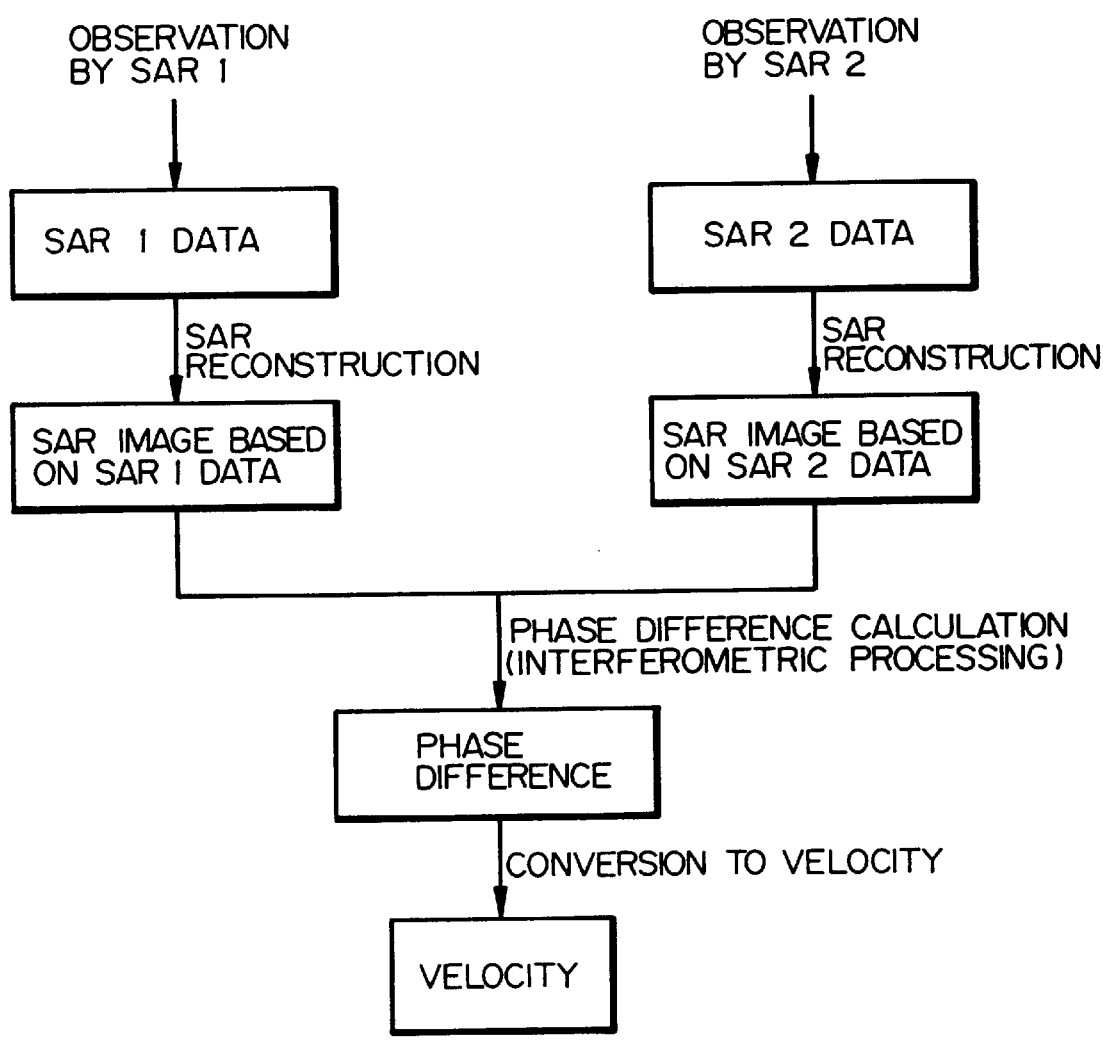
FIG. 2 is a flowchart demonstrating the operation of the SAR shown in FIG. 1.

In the drawings, identical references denote identical structural elements.

BRIEF DESCRIPTION OF THE DRAWINGS

To better understand the present invention, brief reference will be made to a conventional along-track interferometric SAR with two SAR channels, shown in FIGS. 1 and 2. This type of SAR has two SAR channels adjoining each other in the direction of movement so as to observe a target two times at slightly different times, thereby producing two SAR images. The phase difference of the target point is measured on the basis of the two SAR images (interferometric processing) so as to determine the velocity of the target in the direction parallel to the SAR eye direction, i.e., the component of the velocity perpendicular to the azimuth direction. There are shown in FIG. 1 a first SAR channel SAR1, a second SAR channel SAR2, a target O, a velocity V at which the and move, a direction D in which the two SARs move (azimuth direction), a velocity $\mu$ at which the target O moves (perpendicular to the azimuth direction D), and time t. As shown in FIG. 2, data observed by SAR1 is subjected to SAR reconstruction in order to acquire an SAR image. Then, data observed by SAR2 are subjected to SAR reconstruction in order to acquire a second SAR image. A phase difference between the two SAR languages is calculated so as to determine the velocity of the target O.

Figure 3B:
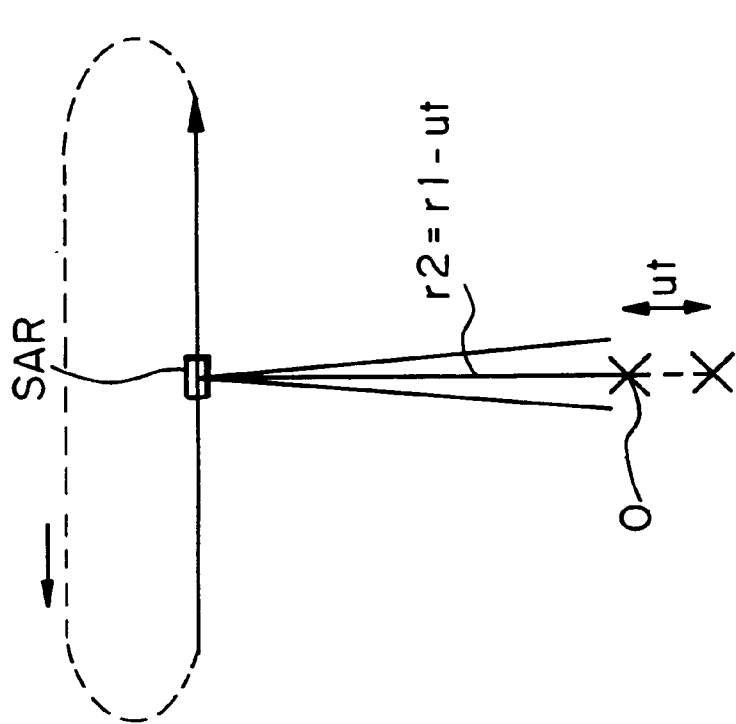
FIG. 3B shows the second observation performed by the SAR of FIG. 3A.
Figure 3A:
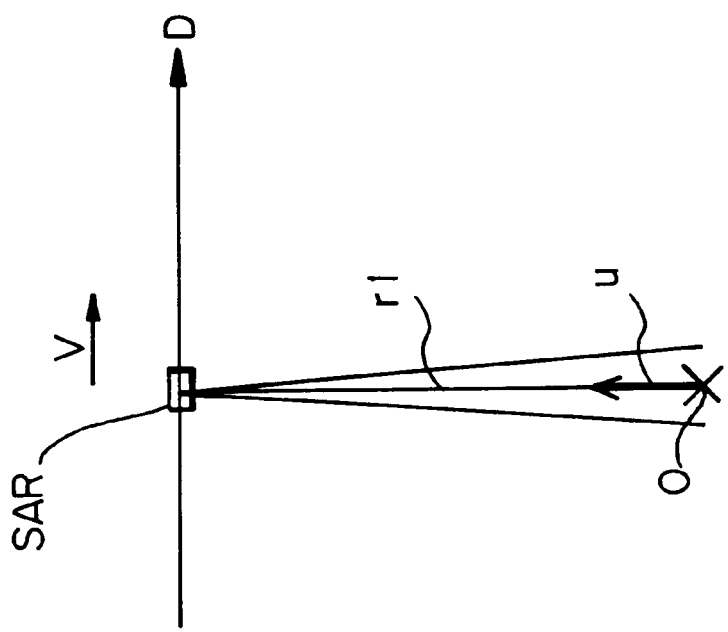
FIG. 3A shows how a conventional along-track interferometric SAR with a single SAR channel and two times of observation performs the first observation.
Figure 4:
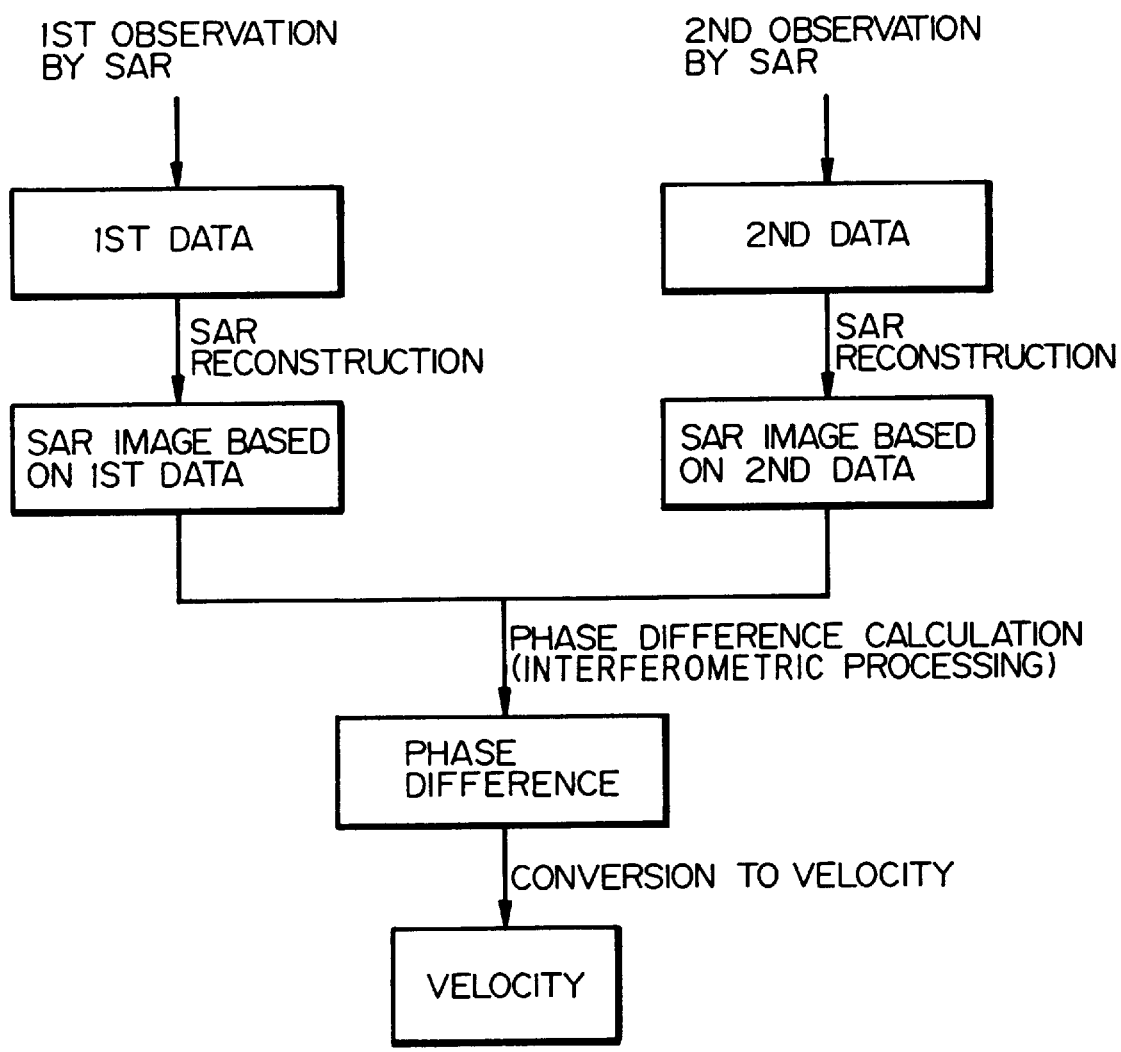
FIG. 4 is a flowchart representative of the operation of the SAR shown in FIGS. 3A and 3B.

FIGS. 3A, 3B and 4 show the conventional along-track interferometric SAR having a single SAR channel and performing two times of observation. This type of SAR observes a target once, then returns, and then observes it again on the same course. FIGS. 3A and 3B respectively show the first and second observations performed by this type of SAR. As shown in FIG. 4, data observed by the first observation are subjected to SAR reconstruction in order to acquire an SAR image. Then, data observed by the second observation are subjected to SAR reconstruction in order to acquire a second SAR image. A phase difference between the two SAR images is calculated so as to determine the velocity of the target O.

The conventional SAR shown in FIGS. 1 and 2 and the conventional SAR shown in FIGS. 3A–4 have the previously discussed problems (1)–(3) left unsolved.

Figure 5C:
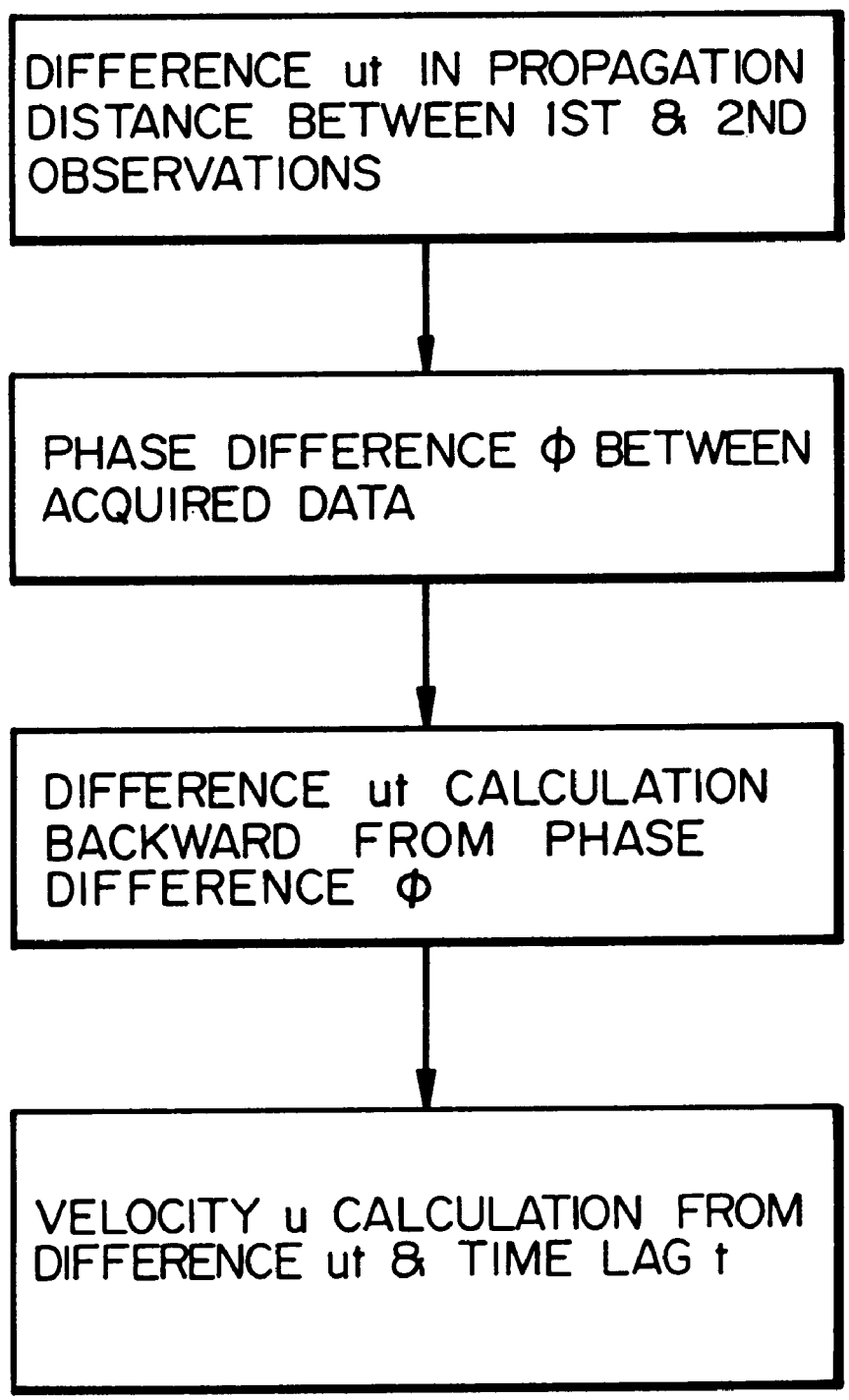
FIG. 5C is a flowchart demonstrating the principle of velocity detection particular to the SAR shown in FIGS. 5A and 5B.

The principle of an along-track interferometric SAR will be described with reference to FIGS. 5A–5C. As shown, while the object O moves in the SAR eye direction, the distance between the object and the flight course of the SAR (propagation distance) varies with the elapse of time. Therefore, when the target O is observed two times at slightly different times, distances $r_1$ and $r_2$ from the SAR to the target O are different from each other, resulting in a phase difference $\phi$. With this phase difference $\phi$, it is possible to calculate a distance $\mu t$ which the target has moved in the eye direction between the two times of observation. By dividing the distance $\mu t$ by the time lag t, a velocity $\mu$ in the eye direction is produced. It follows that the two times of observation is not necessary if two SAR images slightly deviated in time from each other can be reconstructed from data derived from one time of observation.

Referring to FIG. 6, an along-track interferometric SAR embodying the present invention is shown. As shown, the SAR is made up of a single-channel SAR 29 including an antenna 28 and mounted on an aircraft or a satellite 31, and a single processing unit situated on the ground 35. In operation, the single-channel SAR 29 transmits a wave 27 toward a target O via an antenna 28 and receives a wave 26 returned from the target O, thereby observing the target O once. Data 30 resulting from the observation are sent to the ground processing unit by an on-line scheme or an off-line scheme. In the ground processing unit, a processor 33 processes the received data, labeled 32, so as to calculate a velocity 34. As for a satellite, the data output from the SAR 29 may be sent to the ground in the form of a radio wave either directly or by way of a data communication satellite. As for an aircraft, such data may be recorded in a data recorder and transported or may be sent by radio.

How the illustrative embodiment implements an along-track interferometric SAR with a single observation by a single channel SAR will be described with reference to FIG. 7. In the SAR, data acquired during the emission of the wave toward the target 0 are subjected to synthetic aperture processing in order to improve azimuth resolution (resolution in the moving direction of the SAR); because the wave radiated from the antenna 28, FIG. 6, spreads over a certain angular scope, a certain interval exists between the start and the end of the hitting-reflecting of the wave against the target O. The reflection or return from the target O has its frequency lowered due to the Doppler shift with the elapse of time. Therefore, by bisecting the SAR data in the frequency domain (look division), it is possible to produce two SAR images observed at different times. If a phase difference is calculated from the two SAR images (interferometric processing) and then converted to a velocity, the velocity of the target O can be detected.

Figure 8:
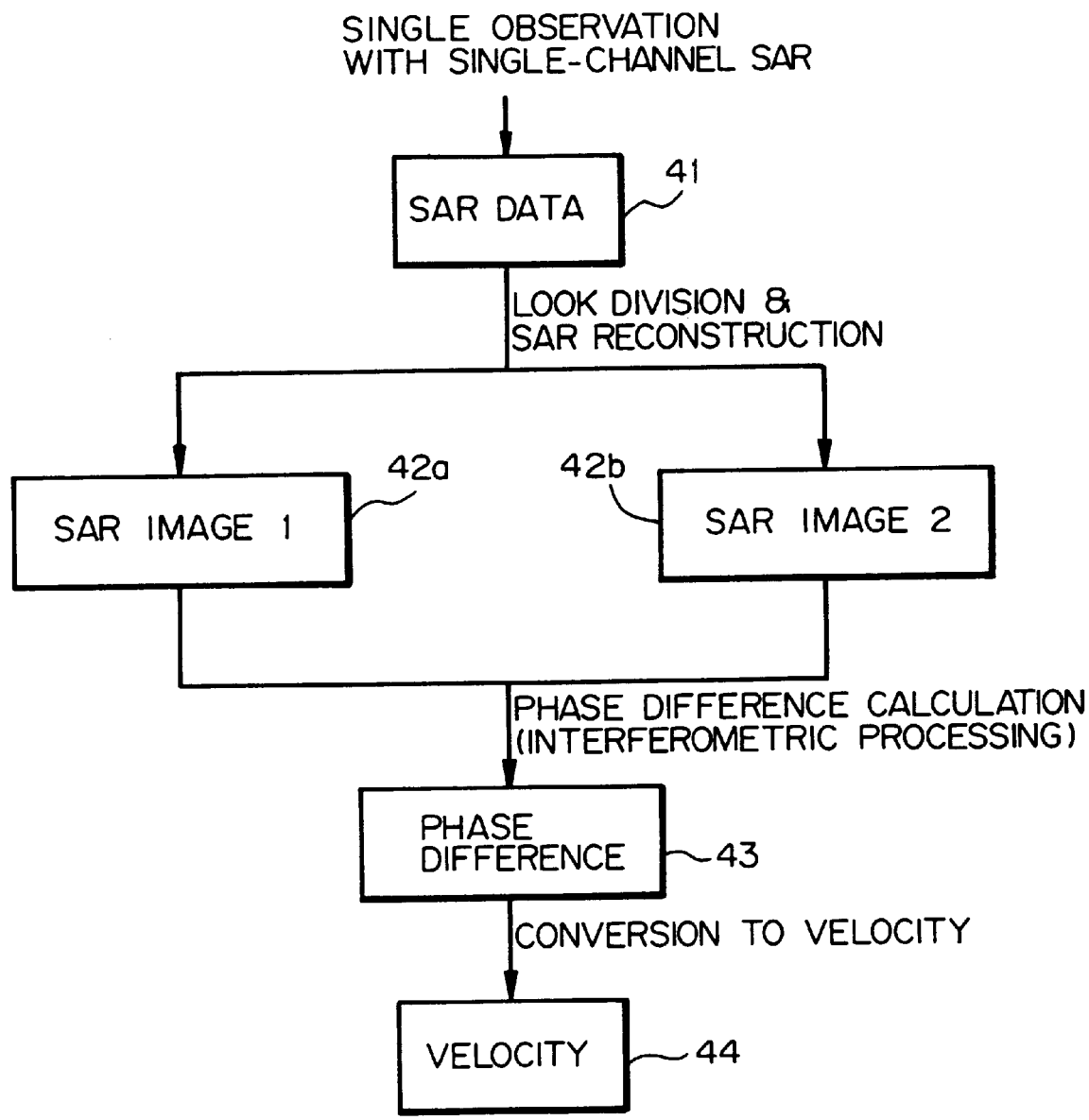
FIG. 8 is a flowchart showing the operation of the embodiment.

FIG. 8 demonstrates the along-track interferometric SAR processing particular to the above embodiment. As shown, SAR data 41 derived from a single observation is subjected to look division and SAR reconstruction. As a result, two SAR images 42a and 42b observed at different times are acquired. A phase difference 43 between the two SAR images is produced and then converted to a velocity 44.

The principle and processing of the illustrative embodiment will be described more specifically. First, synthetic aperture processing which is the basis of the SAR will be described. FIG. 9 shows the Doppler shift of the frequency of a wave returned from the target O. As shown, because the SAR moves relative to the ground, a Doppler shift occurs in the frequency 45 of a return 26 from the target O on the ground, i.e., the frequency decreases in proportion to the elapse of time. By using this phenomenon, the SAR executes synthetic aperture processing in order to implement observation with high azimuth resolution.

Figure 10A:
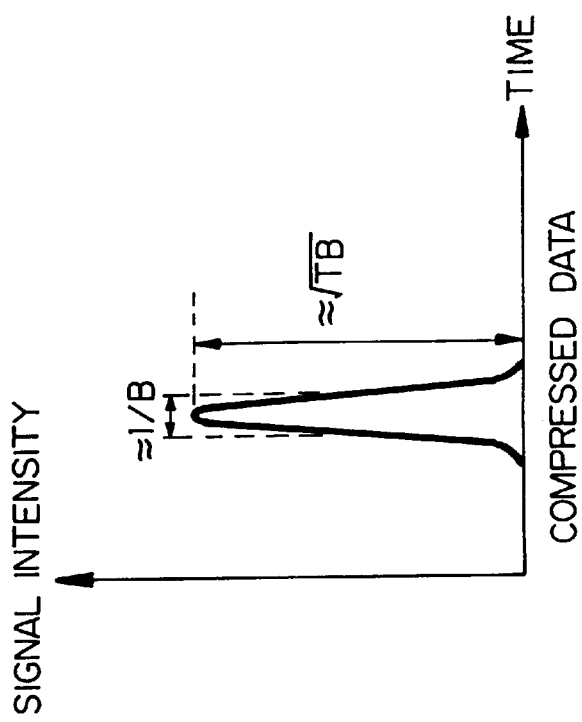
FIGS. 10A and 10B respectively show SAR data and compressed data for describing the improvement in azimuth resolution derived from synthetic aperture processing.
Figure 10B:
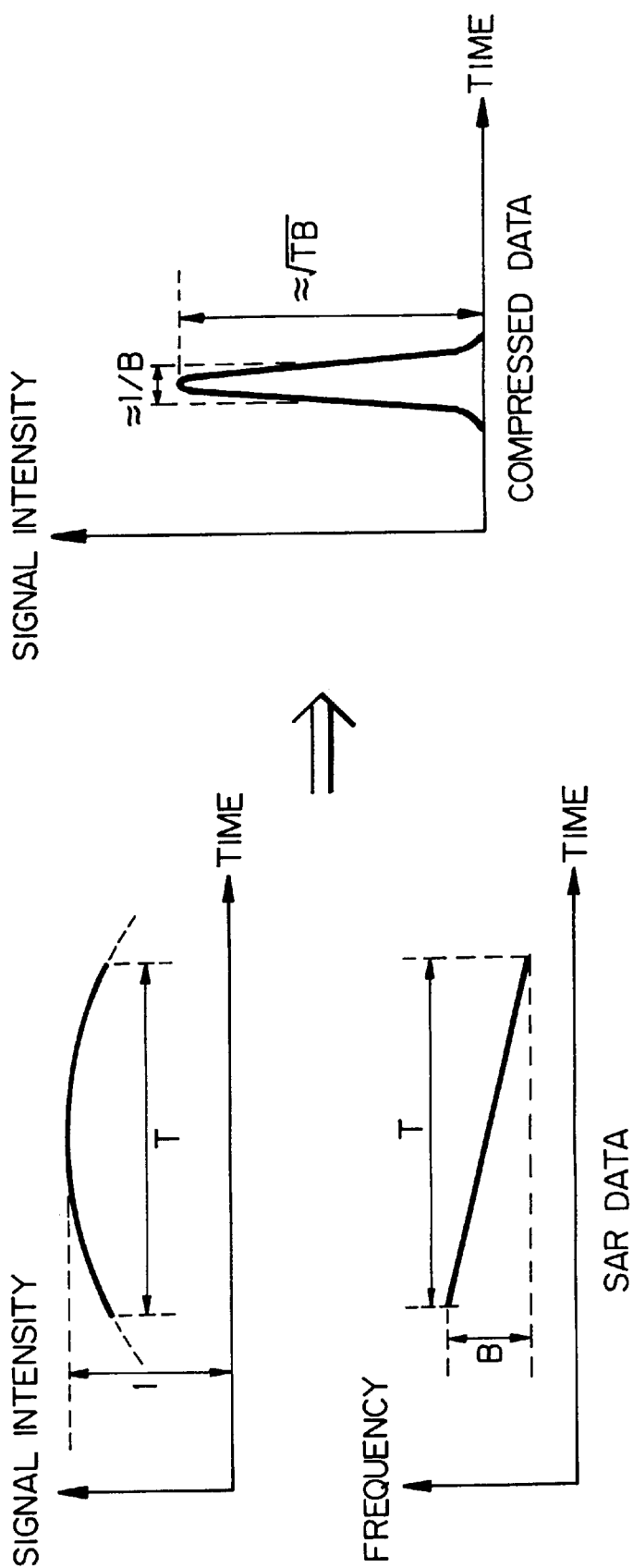

FIGS. 10A and 10B demonstrate the improvement in azimuth resolution achievable with the synthetic aperture processing. FIG. 10A shows SAR data while FIG. 10B shows compressed data. The frequency of the return 26 from the target O decreases in portion to the elapse of time, as stated with reference to FIG. 9. Assume that the Doppler shift has a band width B, that a signal has a time with T and a intensity 1. Based on a correlation between the SAR data and a reference function opposite in frequency-to-time characteristic to the SAR data, there can be achieved a time width of about 1/B and a signal intensity of about $(TB)^{1/2}$. In the SAR, 1/B is far shorter than T, so that the time width is reduced. Consequently, azimuth resolution is improved as seen on an image. A procedure for the above correlation processing is referred to as synthetic aperture processing.

Figure 11:
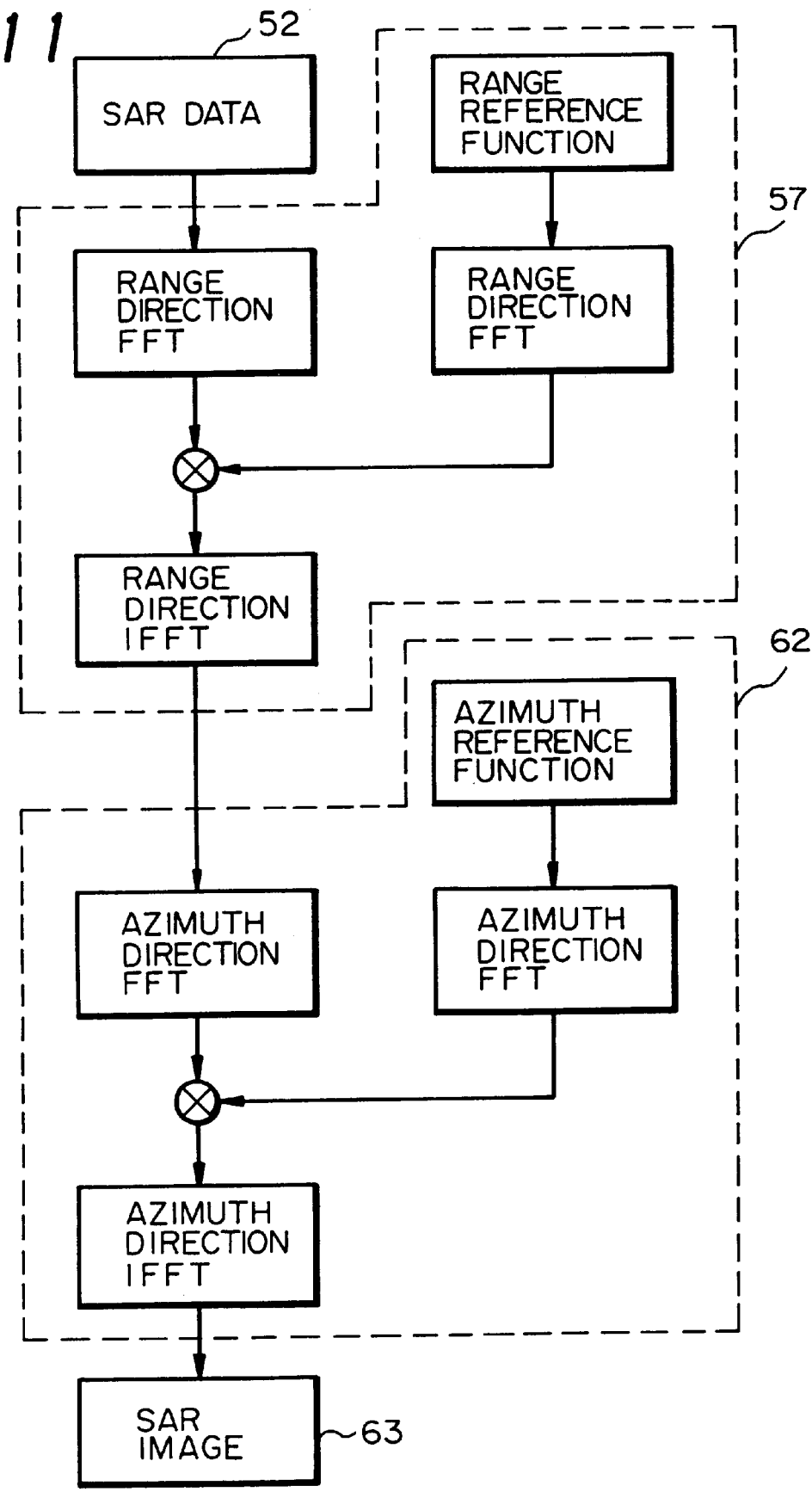
FIG. 11 is a flowchart demonstrating a procedure for reproducing an SAR image from acquired SAR data (Range-Doppler method)

The SAR image reconstruction based on the acquired SAR data (Range-Doppler method) will be described with reference to FIG. 11. As shown, range direction processing (pulse compression) 57 and azimuth direction processing (synthetic aperture processing) 62 are executed with acquired SAR data in order to reconstruct an SAR image 63. The range direction processing 57 shares the same principle with the azimuth direction processing 62. In the SAR, the frequency of the transmitted pulse is provided with a time varying characteristic. Therefore, a correction between the SAR data and a reference function opposite in frequency-to-time characteristic to the pulse is processed (pulse compression), as in the synthetic aperture processing so as to realize high range resolution. Usually, FFT (Fast Fourier Transform) is executed with each of the SAR data and reference function in order to effect the range and azimuth correlation processing in the frequency domain, as shown in FIG. 11.

Look division essential with the illustrative embodiment is as follows. With look division, it is possible to reconstruct a plurality of SAR images from data derived from a single observation. In a conventional SAR, look division is used to improve an image quality. That is, when such SAR images are superposed (averaged), noise on the resulting image is reduced. By contrast, the illustrative embodiment uses look division for the purpose of implementing an along-track interferometric SAR. While the conventional SAR averages a plurality of SAR images derived from look division, the embodiment produces a phase difference between two SAR images derived from look division.

Figure 12:
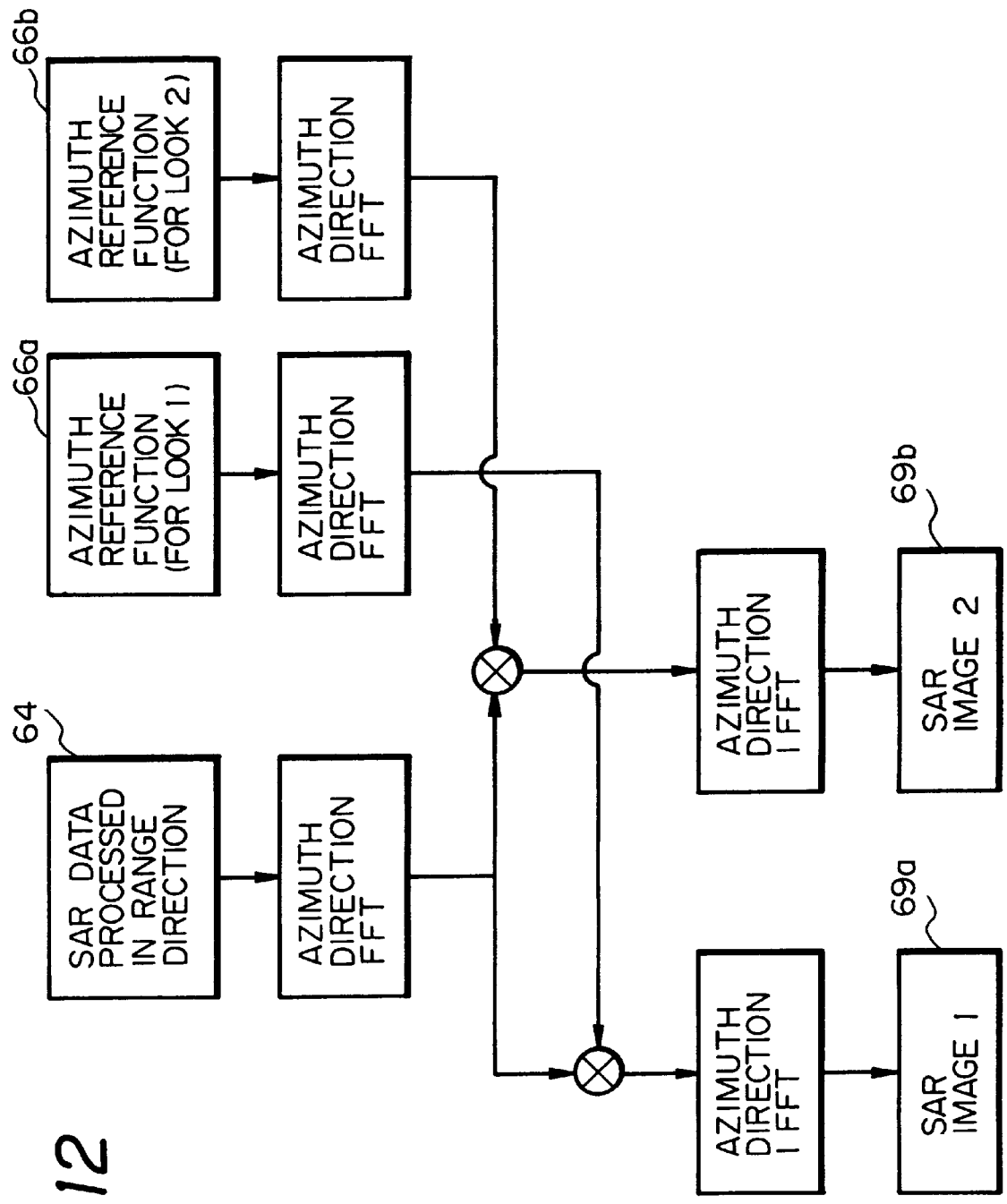
FIG. 12 is a flowchart representative of azimuth direction processing particular to two looks.

FIG. 12 demonstrates azimuth direction processing particular to the illustrative embodiment and effected in the event of look division (two looks). As shown, in the case of two looks, two azimuth reference functions 66a and 66b each is assigned to one of a look 1 and a look 2. A correlation between SAR data 64 undergone range direction processing and each of the azimuth reference functions 66a and 66b is processed. As a result, two SAR images 69a and 69b are reconstructed.

The point of look division is that the frequency band of the SAR data be divided into some portions, and SAR reconstruction be executed with the individual portion. FIG. 13 shows the Doppler spectrum of the SAR data and the Doppler spectra of the azimuth reference functions respectively assigned to the looks 1 and 2. The reference functions each plays the role of a bandpass filter based on its correlation with the SAR data. Only the SAR data lying in a frequency band coinciding with the associated reference function are used for SAR reproduction. The frequency bands of the azimuth reference functions assigned to the looks 1 and 2, respectively, each is one of the two portions of the bisected SAR data frequency band. Therefore, the frequency bands of the SAR data used to reconstruct the SAR images 69a and 69b, FIG. 12, are fully deviated from each other and do not overlap.

Figure 14:
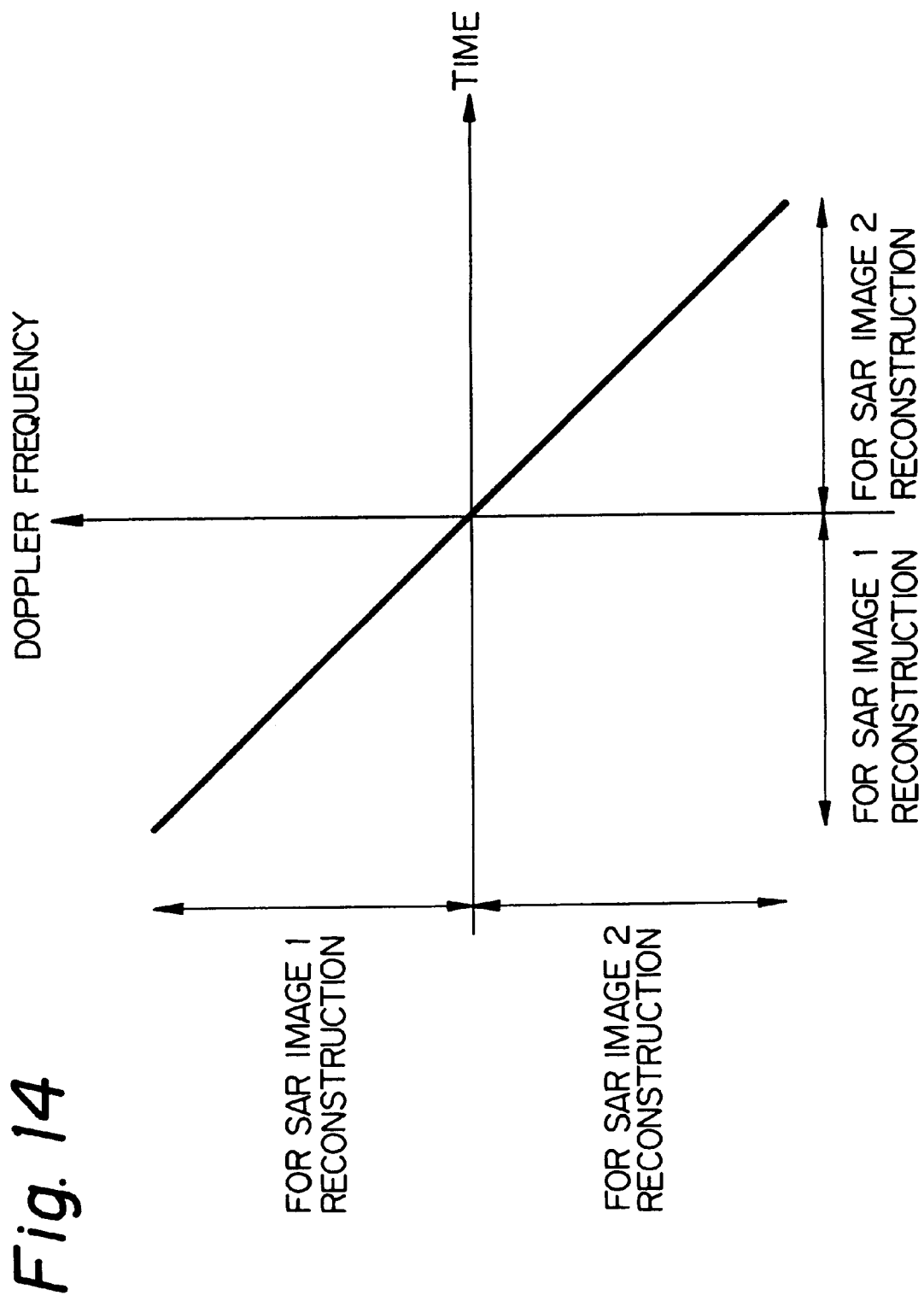
FIG. 14 shows, with respect to a target, a relation between the frequency of a wave returned from the target and time.

FIG. 14 shows the variation of the frequency of a wave returned from a target with respect to time, paying attention to a single target. The frequency of the wave decreases for a moment in proportion to time due to the Doppler shift, so that the data used for the looks 1 and 2 are different both in frequency band and in time. Therefore, the SAR images 69a and 69b associated with the looks 1 and 2, respectively, are observed at slightly different times. This is why an along-track interferometric SAR is achievable by producing a phase difference between the two SAR images 69a and 69b undergone look division and reconstruction.

FIG. 15 shows an alternative embodiment of the present invention. As shown, an SAR 76 is mounted on an aircraft 79 and additionally provided with a processing unit 77 capable of executing real-time SAR reconstruction and along-track interferometric SAR processing. This embodiment allows real-time detection of the velocity of the target O to be effected. The measured velocity appears on a display 78. The operation of the real-time processing unit 77 is identical with the operation of the processing unit 33 of the previous embodiment and it can be implemented only if a look division function and an interferometric processing function are added to the real time SAR processing unit.

In summary, it will be seen that the present invention provides an along-track interferometric SAR practicable with a single SAR channel and therefore noticeably reduces weight, power consumption, and required data rate, compared to a conventional along track interferometric SAR needing two SAR channels. In addition, the SAR of the present invention is extremely low cost. These advantages also hold true when the present invention is compared with a conventional along track interferometric SAR implemented by a divided antenna.

As for hardware, the along track interferometric SAR of the present invention is the same as a conventional SAR not directed toward an along-track interferometric SAR. Therefore, even an SAR currently in operation can implement an along-track interferometric SAR without any additional hardware.

Further, the along track interferometric SAR of the present invention has the following advantages over the method performing two times of observations with a single-channel SAR. The along track interferometric SAR of the present invention needs only one time of observation and can be operated with ease. It is not necessary to effect accurate control over a flight course in order to bring two flight courses into coincidence. In addition, because a time lag between two SAR images is short, the upper limit of velocity which can be observed is high.

Moreover, only if a real-time processing unit is added to an SAR mounted on an aircraft, real-time detection, on the aircraft, of the velocity of a target can be effected. Such real-time processing is not practicable with the method effecting two times of observation.

Various modifications will become possible for those skilled in the art after receiving the teachings of the present disclosure without departing from the scope thereof.

What is claimed is:

1. An along-track interferometric synthetic aperture radar (SAR), comprising:
   a single SAR channel for acquiring SAR data by observing a target only once;
   reconstructing means for reconstructing two SAR images deviated in time from said SAR data based on a Doppler shift caused by movement of the SAR relative to ground to thereby output two reconstructed SAR images; and detecting means for calculating a phase difference between said two reconstructed SAR images to thereby detect a velocity of the target in a SAR eye direction;

said reconstructing means comprising look division means for bisecting said SAR data in a frequency domain and processing bisected SAR data.

2. An along-track interferometric SAR as claimed in claim 1, wherein a real-time processing unit is included in an SAR mounted on an aircraft.

3. An along-track interferometric synthetic aperture radar (SAR), comprising:

a single SAR channel for acquiring SAR data by observing a target only once;

reconstructing means for reconstructing two SAR images deviated in time from said SAR data to thereby output two reconstructed SAR images; and detecting means for calculating a phase difference between said two reconstructed SAR images to thereby detect a velocity of the target in a SAR eye direction;

said reconstructing means comprising:

look division means for bisecting, based on a fact that a frequency of a wave returned from the ground undergoes a Doppler shift due to a movement of a SAR relative to the ground, said SAR data in a frequency domain and processing bisected SAR data, pulse compressing means for processing a correlation between said SAR data and a range reference function opposite in frequency-to-time characteristic to transmitted pulse to thereby output compressed SAR data; and synthetic aperture processing means for processing a correlation between said compressed SAR data and an azimuth reference function assigned to a first look corresponding to one of two frequency bands respectively associated with said bisected SAR data, and processing a correlation between said compressed SAR data and an azimuth reference function assigned to a second look corresponding to the other of said two frequency bands.

4. An along-track interferometric SAR as claimed in claim 3, wherein a real-time processing unit is included in an SAR mounted on an aircraft.

* * * * *